United States Patent [19]
Suzuki

[11] 3,785,450
[45] Jan. 15, 1974

[54] STEERING SYSTEM FOR AN ENDLESS TRACK TYPE TRACTOR

[75] Inventor: Mitsuaki Suzuki, Hirakata, Japan

[73] Assignee: Kabushiki Kaisha Komatsu Seisakusho, Tokyo, Japan

[22] Filed: Mar. 28, 1972

[21] Appl. No.: 238,557

[52] U.S. Cl. .............................. 180/6.7, 74/665 T
[51] Int. Cl. ............................................. B62d 11/12
[58] Field of Search ............... 180/6.7, 6.66, 6.2; 74/665 T, 677, 718

[56] References Cited
UNITED STATES PATENTS

| | | | |
|---|---|---|---|
| 3,075,408 | 1/1963 | Chapman et al. | 74/677 |
| 3,239,020 | 3/1966 | Morris et al. | 180/6.7 |
| 3,467,212 | 9/1969 | Doll | 180/6.2 |

*Primary Examiner*—Kenneth H. Betts
*Assistant Examiner*—John A. Pekar
*Attorney*—James E. Armstrong et al.

[57] ABSTRACT

A steering system for an endless track type tractor having an engine which has a power distribution device for equally distributing the power of the engine to two outputs, a pair of couplings, a pair of torque converters, a pair of transmissions, a pair of bevel gear mechanisms, a pair of lateral shafts, a pair of final reduction gear mechanisms, a lateral shaft engaging clutch, and a hydraulic control device having an oil tank, a hydraulic pump, a pair of direction shifting valves, a pair of speed control valves, a pair of steering control valves, and a lateral shaft engagement control valve for travelling straight, turning right or left by braking one endless track and driving the other endless track or by inversely driving both the endless tracks. Thus, the turning performance of the tractor is improved.

7 Claims, 21 Drawing Figures

STEERING SYSTEM FOR AN ENDLESS TRACK TYPE TRACTOR

BACKGROUND OF THE INVENTION

This invention relates to a steering system for an endless track type tractor, and more particularly to a hydraulic control system of the steering system for an endless track type tractor having dual power trains.

Since conventional construction equipment has a single train of power transmission mechanism having one torque converter, one transmission and one bevel gear system, the steering mechanism thereof has steering clutches and brakes mounted at the right and left output shafts of the bevel gear system so as to turn by independently operating these steering clutches and brakes. More particularly, the power of the engine of the conventional tractor is transmitted through a coupling, torque converter, transmission, and further through a bevel pinion, bevel gear, and lateral output shafts to the right and left steering clutches, then to a final reduction gear having pinions and gears to the right and left sprockets of the tractor. In such type, since the tractor has one torque converter and transmission, when the tractor is turning, one steering clutch is disengaged using the steering brake.

When such a conventional single power train of a power transmission system is adopted in a large type of construction equipment such as an endless track type tractor, a large type of power transmission system is necessary which results in high production expense and difficult technique.

SUMMARY OF THE INVENTION

This invention contemplates the elimination of the aforementioned disadvantages of the conventional construction equipment such as in an endless track type tractor, and to provide a novel and improved steering system adapted for an endless track type tractor.

It is, therefore, an object of the present invention to provide a steering system for an endless track type tractor which is adapted for both the small type and large type of construction tractor.

It is another object of the present invention to provide a steering system for an endless track type tractor which operates in the transmission without using any particular steering mechanism such as steering clutches provided at the output shaft of the bevel gear system.

It is a further object of the present invention to provide a steering system for an endless track type tractor which is steered by inversely driving both the endless tracks to each other so as to improve the turning performance of the tractor.

It is still another object of the present invention to provide a steering system for an endless track type tractor which has a redundancy in the power transmission train of the engine so as to provide a good reliability in operation.

Briefly, in accordance with the present invention, the foregoing and other objects are attained, in one aspect, by the provision of a steering system for an endless track type tractor having an engine which comprises a power distribution device for equally distributing the power of the engine to two outputs, a pair of power trains each having a torque converter, a coupling for the power from said power distribution device to said torque converter, a transmission, a lateral output shaft a bevel gear mechanism having a bevel pinion and a bevel gear for transferring the power from the torque converter through the tranmission to said lateral output shaft, and a final reduction gear mechanism having a pinion and a gear for transferring the power from said lateral output shaft to a sprocket for driving the endless track, a lateral shaft engaging clutch for engaging both the lateral shafts integrally when the tractor runs straight, a pair of steering brakes for braking one lateral shaft when the tractor turns, a hydraulic control device having an oil tank, a hydraulic pump, a direction shifting valve for selecting forward, neutral or reverse travel of the tractor, a speed control valve for selecting the first, second or third speed in the tractor, a pair of steering control valves for selecting straight, one-side or both-side turning travel for the tractor, and a lateral shaft engagement control valve for selecting straight operation or turning of the tractor, a pair of first speed clutches for engaging first speed gears in the transmission when said speed control valves are shifted to first speed position, a pair of second speed clutches for engaging second speed gears in the transmission when said speed control valves are shifted to the second speed position, a pair of third speed clutches for engaging the third speed gears in the transmission when said speed control valves are shifted to the third speed position, a pair of forward clutches for engaging forward gears in the transmission when said direction shifting valve is shifted to the forward position, a pair of reverse clutches for engaging the reverse gears in the transmission when said direction shifting valve is shifted to the reverse position.

Thus, in this invention dual power trains are employed which are composed of two torque converters, transmissions and bevel gear systems so as to function so as to turn the tractor through the transmission. More particularly, the tractor is turned or runs straight by the operation of the right and left transmissions without using any particular steering mechanism such as steering clutches provided at the output shaft of the bevel gear system.

Further, the tractor is turned by inversely driving the endless thereof to each other in order to improve the turning performance of the tractor.

BRIEF DESCRIPTION OF THE DRAWINGS

A more complete appreciation of the present invention will be readily obtained as the same become better understood by reference to the following detailed description when taken in conjunction with the accompanying drawings, wherein.

DETAILED DESCRIPTION OF THE PREFERRED EMBODIMENT

Figure 1:
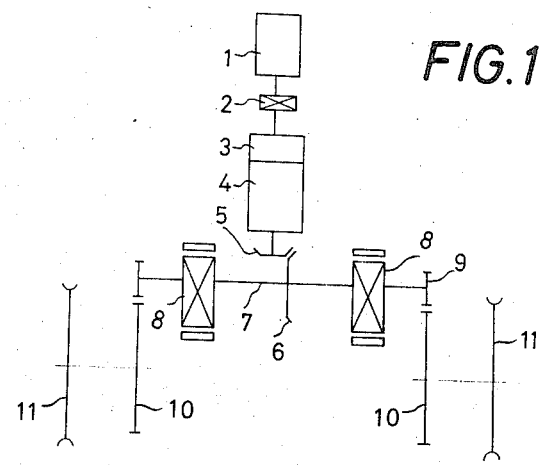
FIG. 1 is a schematic view in block form of the conventional power transmission system in an endless track type tractor.

Reference is now made to the drawings, wherein the line reference numerals designate identical or corresponding parts throughout the several views, and for better understanding of the present invention, the conventional construction of the power transmission system of the endless track type tractor will now be described with reference to FIG. 1, which shows the power train of the conventional endless track type tractor.

The power of the engine 1 is transmitted through a coupling 2, torque converter 3, transmission 4, and further through a bevel pinion 5, bevel gear 6, and lateral output shaft 7 to the right and left steering clutches 8 and 8, then to final reduction gear having pinions 9 and gears 10 to right and left sprockets 11 of the tractor. In this type, since the tractor has one torque converter 3 and transmission 4, when the tractor is turning, one steering clutch 8 is disengaged using the steering brake. When such a single power train of a power transmission system is used in a large type of tractor, a large type of power transmission system is necessary which results in high production expense and difficult techniques.

Figure 2:
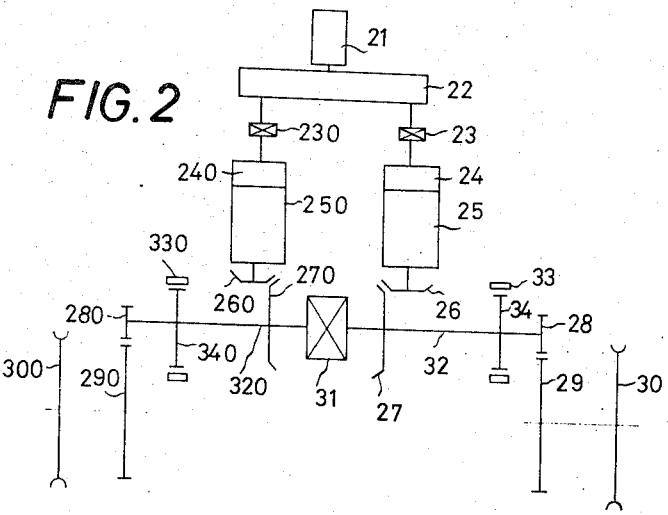
FIG. 2 is a schematic view in block form of the power transmission system in an endless track type tractor constructed according to the present invention.

Reference is now made to FIG. 2, which shows one embodiment of the power transmission system in an endless track type tractor constructed according to this invention.

The power is transmitted from an engine 21 into a power distribution device 22, in which the power is divided into right and left power trains and transmitted to a pair of couplings 23 and 230. The power from the couplings 23 and 230 is further transmitted through a pair of torque converters 24 and 240, a pair of transmissions 25 and 250, a pair of bevel pinions 26 and 260, a pair of bevel gears 27 and 270, and lateral shafts 32 and 320, in turn, and further to a pair of pinions 28 and 280, and gears 29 and 290 of the final reduction gears to a pair of sprockets 30 and 300.

In the drawings, the symmetrical parts are so designated that the left parts are illustrated by ten times the numeral valves of the right parts in FIGS. 2 to 12.

In these power trains, a lateral shaft engaging clutch 31 is provided so as to directly connect the right and left output shafts 32 and 320 to each other, when the endless track type tractor travels in a straight direction in order to eliminate the difference of the speed thereof, because the power trains are dual and contains a pair of torque converters, transmissions and bevel gear systems.

There are also provided in these power trains, a pair of steeering brakes 33, 34 and 330, 340 for braking either one lateral shaft when the tractor is turned right or left. In addition to the operations include the lateral shaft engaging clutch 31 being disengaged and either transmission 25 or 250 is shifted to neutral position. This turning is hereinafter called a "one-side turn."

There is another turning manner of the tractor, in which the lateral shaft engaging clutch 31 is disengaged and both the transmissions 25 and 250 are inversely rotated with respect to each other, which turning is hereinafter called a "both-side turn."

Figure 3:
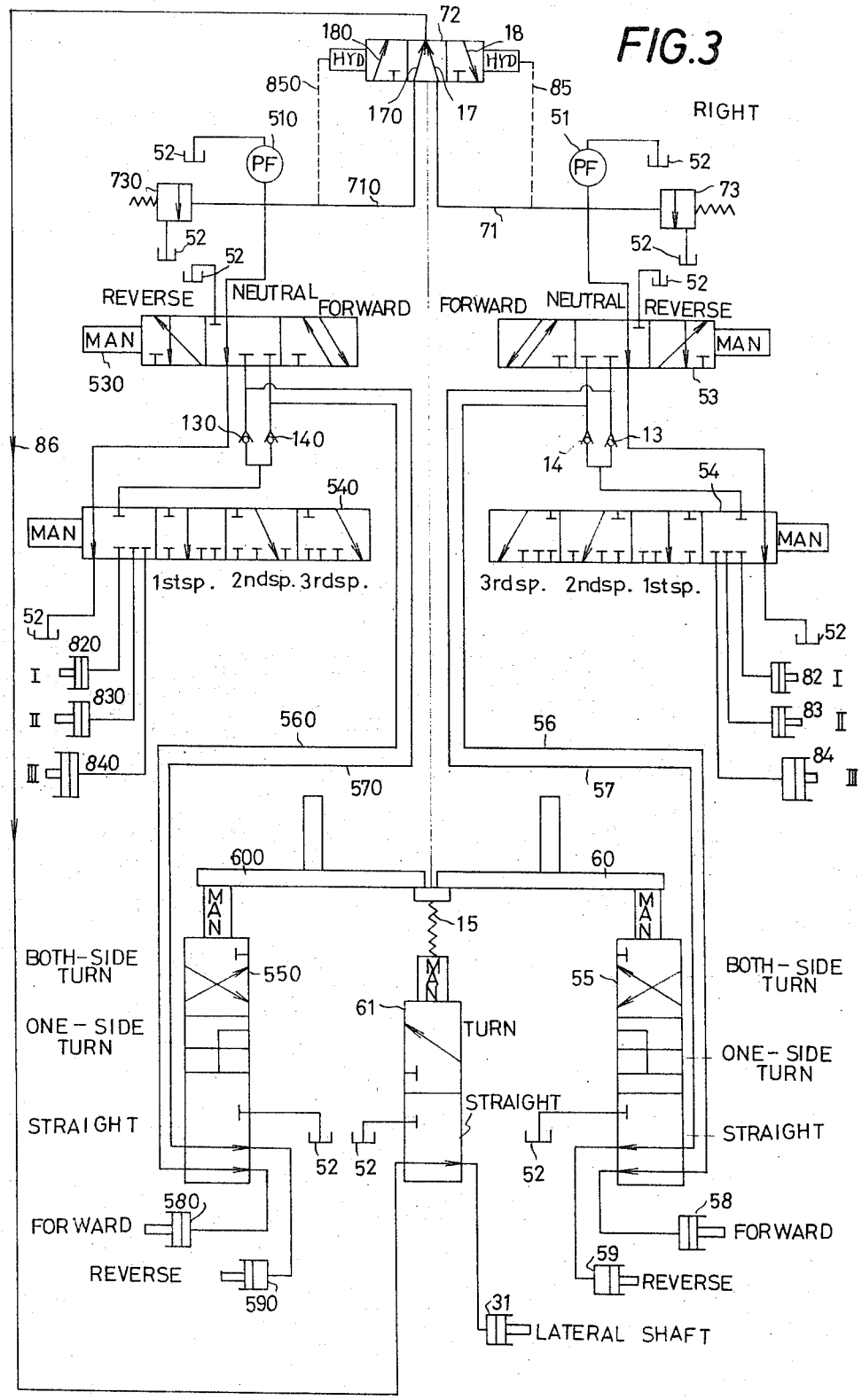
FIG. 3 is a hydraulic circuit diagram in principle form of the hydraulic control circuit of the steering system for an endless track type tractor as one embodiment of the present invention.

Referring now to FIG. 3, which shows one embodiment of the hydraulic control circuit of the steering system for an endless track type tractor of this invention, the hydraulic control circuit has a common oil tank 52, hydraulic pumps 51 and 510 for feeding fluid or oil from the oil tank 52 to a pair of direction shifting valves 53 and 530 and pressure compensating valve 72. The oil from the direction shifting valves 53 and 530 is branched to a pair of speed control valves 54 and 540 through check valves 13, 14 and 130, 140, and to right and left steering control valves 55 and 550 through fluid passages 56, 57 and 560, 570.

The pressure compensating valve 72 is neutrally positioned when the right and left hydraulic pumps 51 and 510 operate normally since the hydraulic pressures applied through the right and left fluid passages 85 and 850 designated by broken lines to the pressure compensating valve 72 are equal, so that the hydraulic output of both the hydraulic pumps 51 and 510 are equally gathered in fluid passages 17 and 170 therein through fluid passages 71 and 710 to flow all hydraulic fluid through fluid passage 86 to a lateral shaft engagement control valve 61. The lateral shaft engagement control valve 61 is always set to a biased straight position to pass the hydraulic oil from the pressure compensating valve 72 to the lateral shaft engaging clutch 31 so as to always engage the lateral shaft engaging clutch 31. If either pump 51 or 510 is damaged, since the hydraulic pressure of the pump is removed from the pressure compensating valve 72, the pressure compensating valve 72 is operated it at its side so as to pass the hydraulic fluid at the normal pump side through fluid passage 18 or 180 to the lateral shaft engagement control valve 61 in order to maintain the normal operation of the lateral shaft engaging clutch 31.

The direction shifting valves 53 and 530 have three positions such as forward, neutral and reverse for operating the tractor in a forward direction, at stop and reverse, respectively to pass the hydraulic fluid to the forward, neutral (no flowing), and reverse clutches 58, 580 and 59, 590 to engage the respective clutches in the transmissions through the fluid passages 56, 560 and 57, 570, respectively through the steering control valves 55 and 550, respectively. The speed control valves 54 and 540 have four positions such as neutral, first, second and third speed positions for operating the tractor while at a stop, first, second and third speeds, respectively to pass the hydraulic fluid from the pumps 51 and 510 through the direction shifting valves 53 and 530 to oil tank 52, then first, second and third speed clutches 82, 820, 83, 830 and 84, 840, respectively. The steering control valves 55 and 550 have three positions such as straight, one-side turn and both-side turn positions for travelling the tractor in a straight direction. Turning is accomplished by driving either side of the endless track and braking the other endless track. Turning is also accomplished by driving inversely both the endless trails to pass the hydraulic fluid from the hydraulic pumps 51 and 510 through the direction shifting valves 53 and 530 to the forward or reverse clutches 58, 580 or 59, 590 in a straight position, to the oil tank at one side and to the forward clutch at the other side in a one-side turn position, and to a forward or reverse clutch at one side and vice versa at the other side in the both-side turn position. The lateral shaft engagement control valve 61 has two positions such as straight and turn positions for operating the tracotr in a straight direction and turning in either direction, respectively to pass the hydraulic fluid from the pressure compensating valve 72 to the lateral shaft engaging clutch 31 and drain the hydraulic oil from the lateral shaft engaging clutch 31 to the oil tank 52, respectively.

In this hydraulic control cicuit, there are provided relief valves 73 and 730 for maintaining the hydraulic pressure constant at the output of the pumps 51 and 510.

Figure 4:
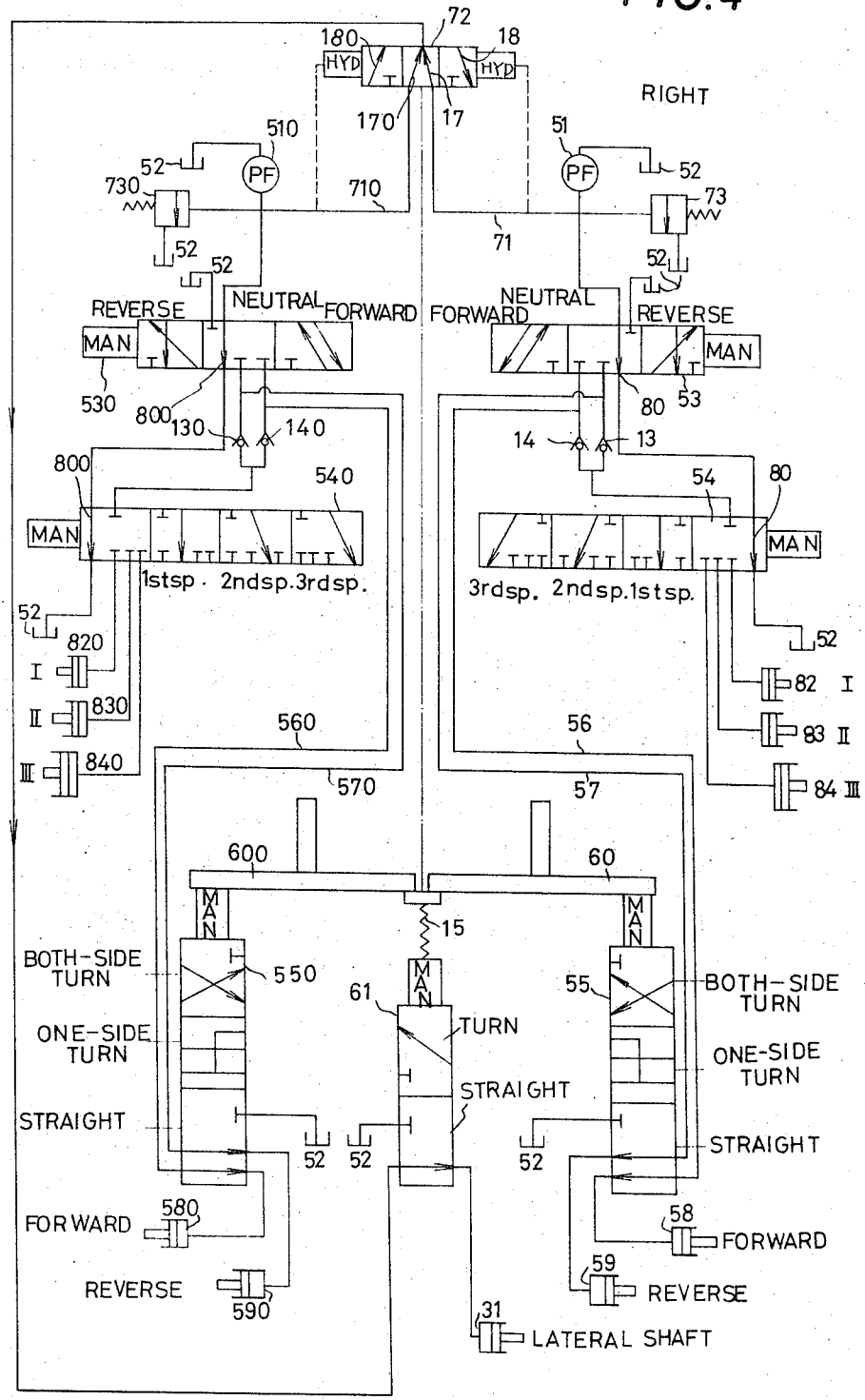
FIG. 4 is a view similar to FIG. 3, but when the hydraulic control circuit is in a neutral position.

Reference is now made to FIG. 4, which show the hydraulic control circuit in a neutral position. The direction shifting valves 53 and 530 are shifted to a neutral position, and the speed control valves 54 and 540 are set also to a neutral position. The right and left lever linkages 60 and 600 for manipulating the steering control valves 55 and 550, respectively are not operated. The hydraulic fluid from the hydraulic pumps 51 and 510 passes through the direction shifting valves 53 and 530 at fluid passages 80 and 800 and speed control valves 54 and 540 to the oil tank 52 with the result that the clutches 58, 580 and 59, 590 are not engaged at all so that the tractor does not travel.

In the transmission, the first, second and third speed clutches 82, 820, 83, 830 and 84, 840; and forward and reverse clutches 58, 580 and 59, 590 are directly connected to each other in the gear trains, and when either one of both types of the clutches are selected to be engaged, the tractor is operated by the combination of either speed and travelling direction.

Figure 5:
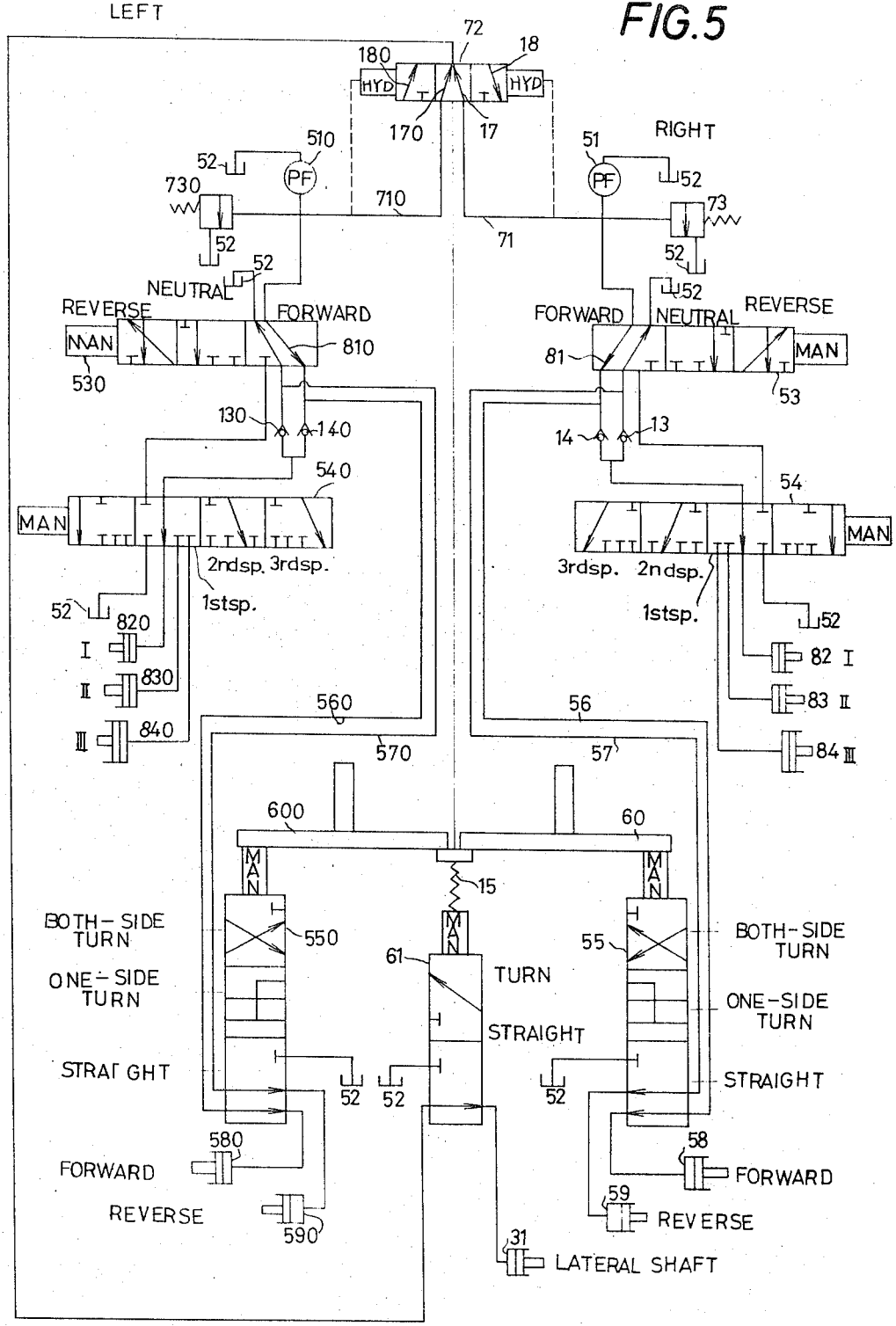
FIG. 5 is a view similar to FIG. 3, but when the hydraulic control circuit is in the forward and first speed position.

Referring now to FIG. 5, which shows the hydraulic control circuit in forward and first speed positions, the directions shifting valves 53 and 530 are shifted to the forward position, and the speed control valves 54 and 540 are shifted to first speed position. In this state, the hydraulic fluid from the pumps 51 and 510 is fed through the fluid passages 81 and 810 of the direction shifting valves 53 and 530, respectively to be branched thereat through the first speed position of the speed control valves 54 and 540 to the first speed clutches 82 and 820 so as to engage the first speed clutches 82 and 820 through the check valves 14 and 140; and through the fluid passages 56 and 560 and the straight position of the steering control valves 55 and 550 to the forward clutches 58 and 580 so as to engage the forward clutches 58 and 580. Thus, the tractor travels in a forward direction at first speed.

The right and left direction shifting valves 53 and 530; and the right and left speed control valves 54 and 540 are interlocked, respectively to always be shifted to the same positions at the right and left sides.

In this state, when the speed control valves 54 and 540 are shifted similarly to the second and third speed positions, the hydraulic fluid from the pumps 51 and 510 are similarly fed to the second and third speed clutches 83, 830 and 84, 840, respectively to engage the respective clutches so as to operate the tractor in forward direction at the second and third speeds, respectively.

Figure 6:
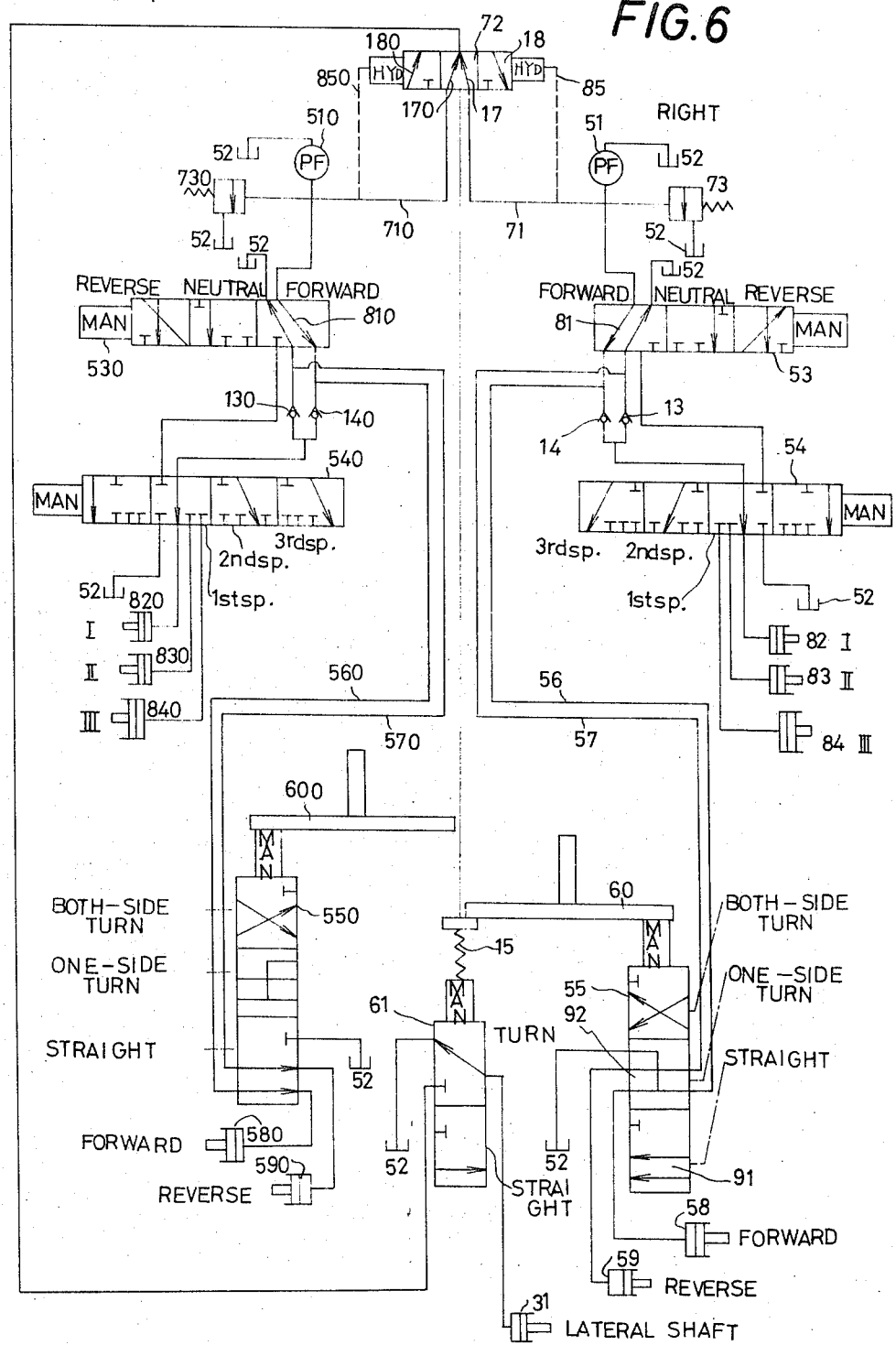
FIG. 6 is a view similar to FIG. 5, but when the hydraulic control circuit is in a right one-side turn position.

Reference is now made to FIG. 6, which shows the hydraulic control circuit in a right one-side turn position. Though the steering control valves have three positions such as straight, one-side turn and both-side turn position so that the steering system of the tractor may operate similarly in any of these positions of the steering control valves in any speed and travel directions of the speed control and direction shifting valves, respectively, one example such as first speed and forward positions of the respective valves will be described with reference to the steering control valves in two positions such as one-side and both-side turn positions referring to FIGS. 6 and 7.

The steering of the tractor in a one-side turn, is conducted by driving one endless trail and by braking the other endless track by disengaging the lateral shaft engaging clutch 31 and engaging either the steering brakes 33, 34 or 330, 340 so as to decelerate the drive wheel or by engaging strongly either the steering brakes 33, 34 or 330, 340 so as to stop the drive wheel to turn about the stopped endless track as a center, as has been defined as a one-side turn.

More particularly, as to the one-side turn of the tractor, when the right lever linkage 60 of the steering control valve 55 is, for example, shifted to its one-side turn position, the fluid passage 91 in the straight position of the steering control valve 55 is changed to fluid passage 92, and the hydraulic oil in the right forward clutch 58 is drained through the fluid passage 92 to the oil tank 52, and at the same time the lateral shaft engagement control valve 61 is also shifted to the turn position interlocking with the operation of the right lever linkage 60 through a spring 15, and the hydraulic fluid in the lateral shaft engaging clutch 31 is drained through the lateral shaft engagement control valve 61 to the oil tank 52 with the result that both the right and left lateral shafts may rotate independently so as to drive both the endless tracks independently. Therefore, by properly braking either lateral shaft the tractor can be turned at a desired angle.

Figure 7:
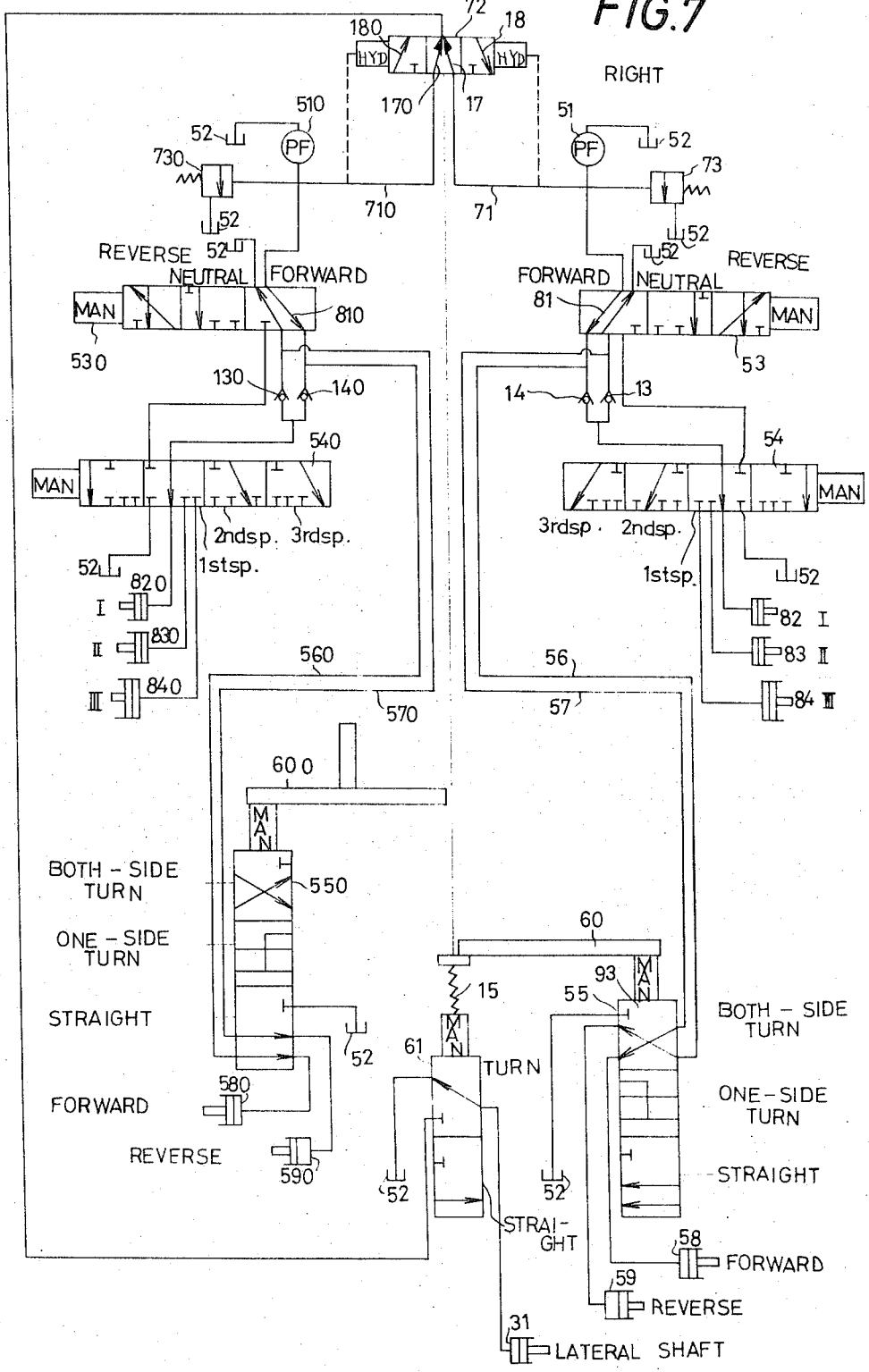
FIG. 7 is a view similar to FIG. 5, but when the hydraulic control circuit is in right both-side turn position.

Referring to FIG. 7, which shows the hydraulic control circuit in a right both-side turn position, when the right lever linkage 60 of the steering control valve 55 is further shifted, for example, to its both-side turn position, the fluid passage 92 in the one-side turn position is futher changed to fluid passage 93, and the hydraulic oil is fed to the right reverse clutch 59 to engage the right reverse clutch 59 with the result that the right endless track is driven in a reverse direction while the left endless track is driven forward at the first speed in this case. Here, the lateral shaft engagement control valve 61 is not changed but remains in the same position by the flexure of the spring 15 as that shown in FIG. 6.

Figure 8:
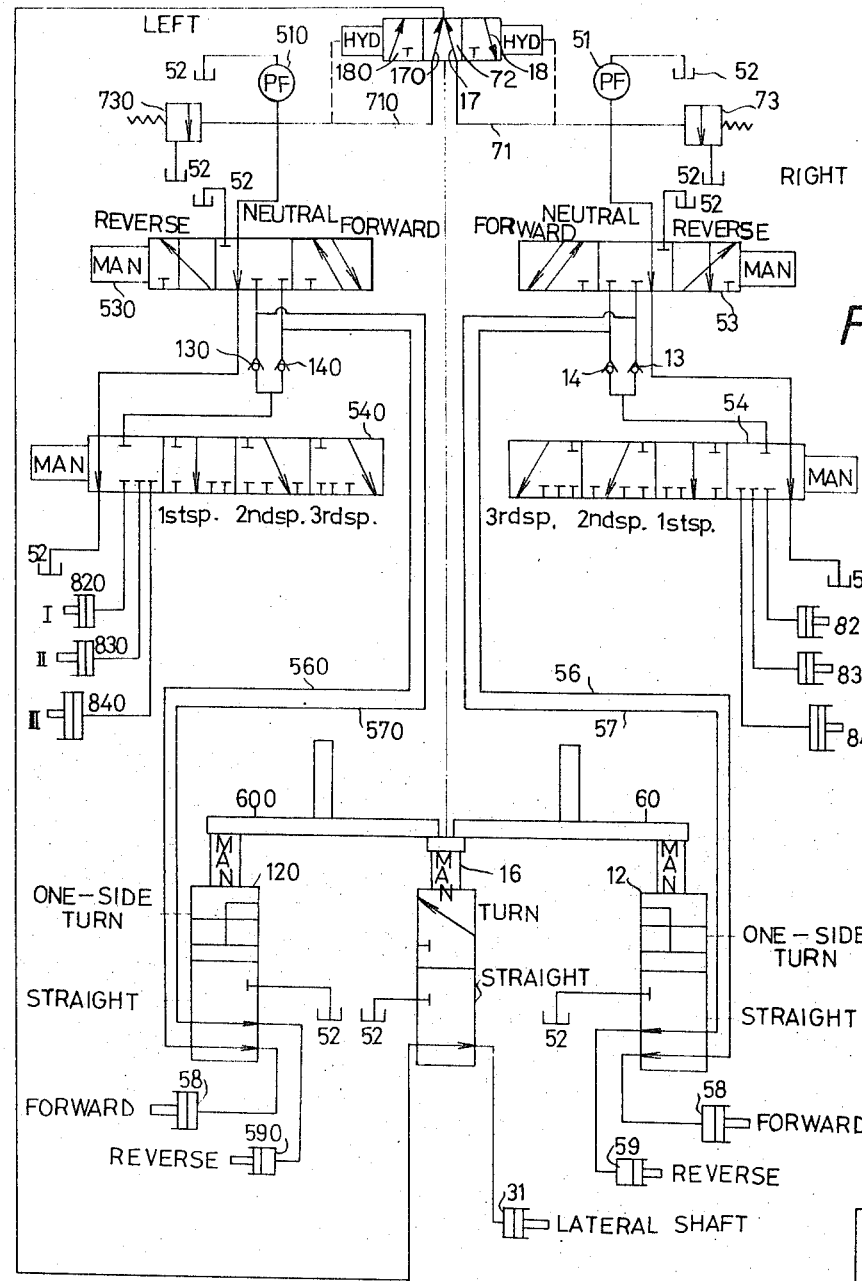
FIG. 8 is a hydraulic circuit diagram in principle form of another embodiment of the hydraulic control circuit of the steering system for an endless track type tractor of this invention.

Reference is now made to FIG. 8, which shows another embodiment of the hydraulic control circuit of the steering system for the endless track type tractor of this invention.

In this hydraulic control circuit, the steering control valves 55 and 550 have only straight and one-side turn positions omitting the both-side turn position adapted for a simple tractor where it is not necessary to provide a both-side turn, and the spring 15 of the steering control valves 55 and 550 is also omitted but the lever linkages 60 and 600 are rigidly connected to the lateral shaft engagement control valve 61.

Figure 9:
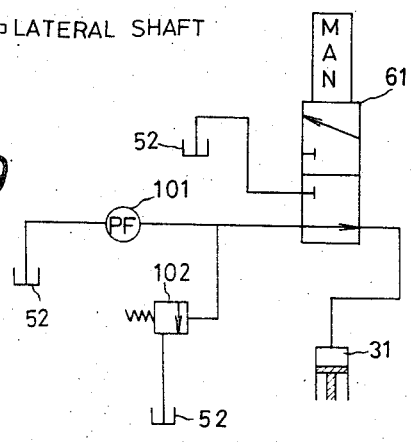
FIG. 9 is a schematic view in a block form of partial hydraulic control circuit without using a pressure compensating valve but using a lateral shaft engaging clutch pump.
Figure 10A:
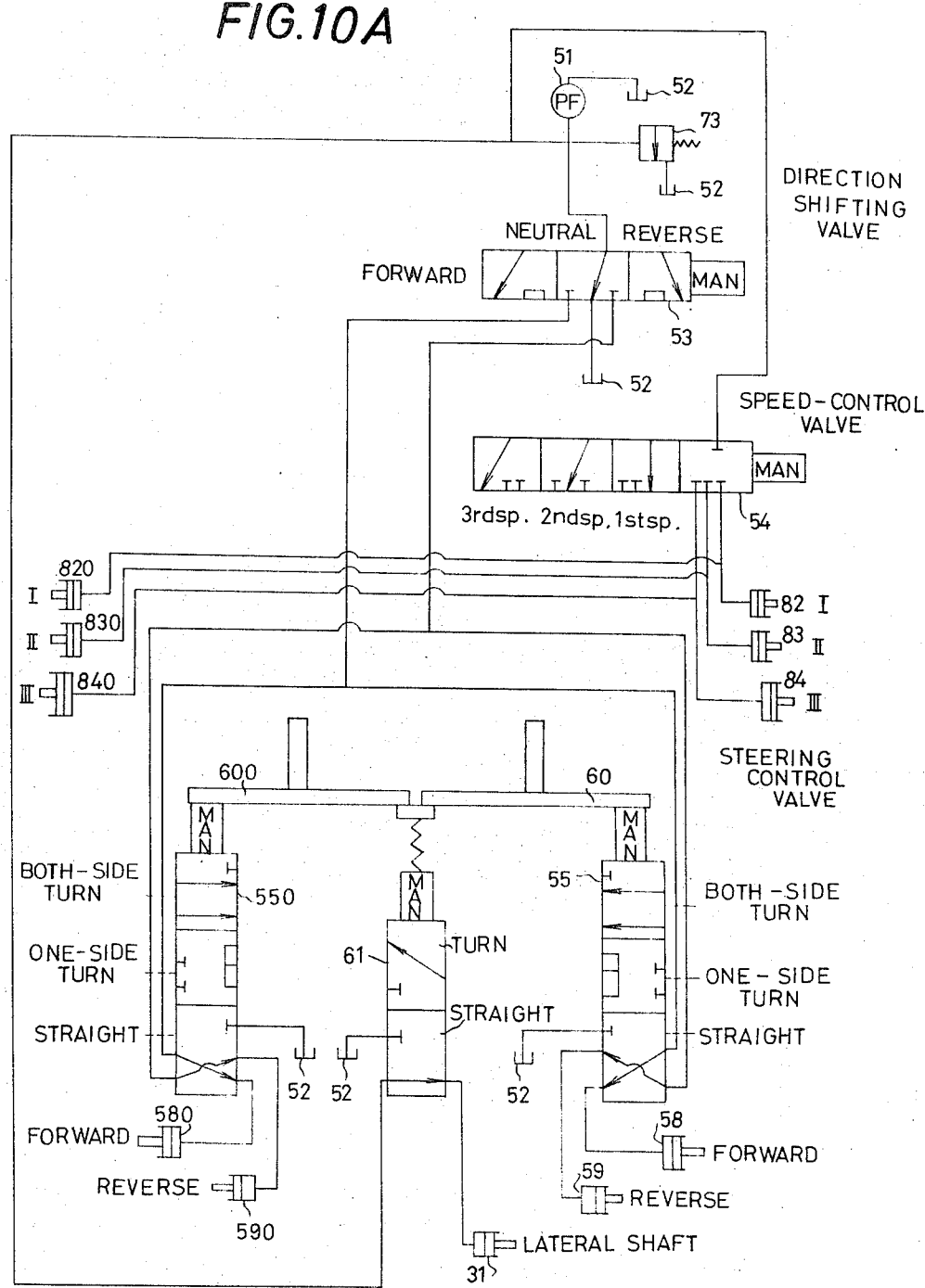
FIGS. 10A to 10D are views similar to FIGS. 4 to 7, respectively, but showing another embodiment of the hydraulic control circuit of this invention.
Figure 10B:
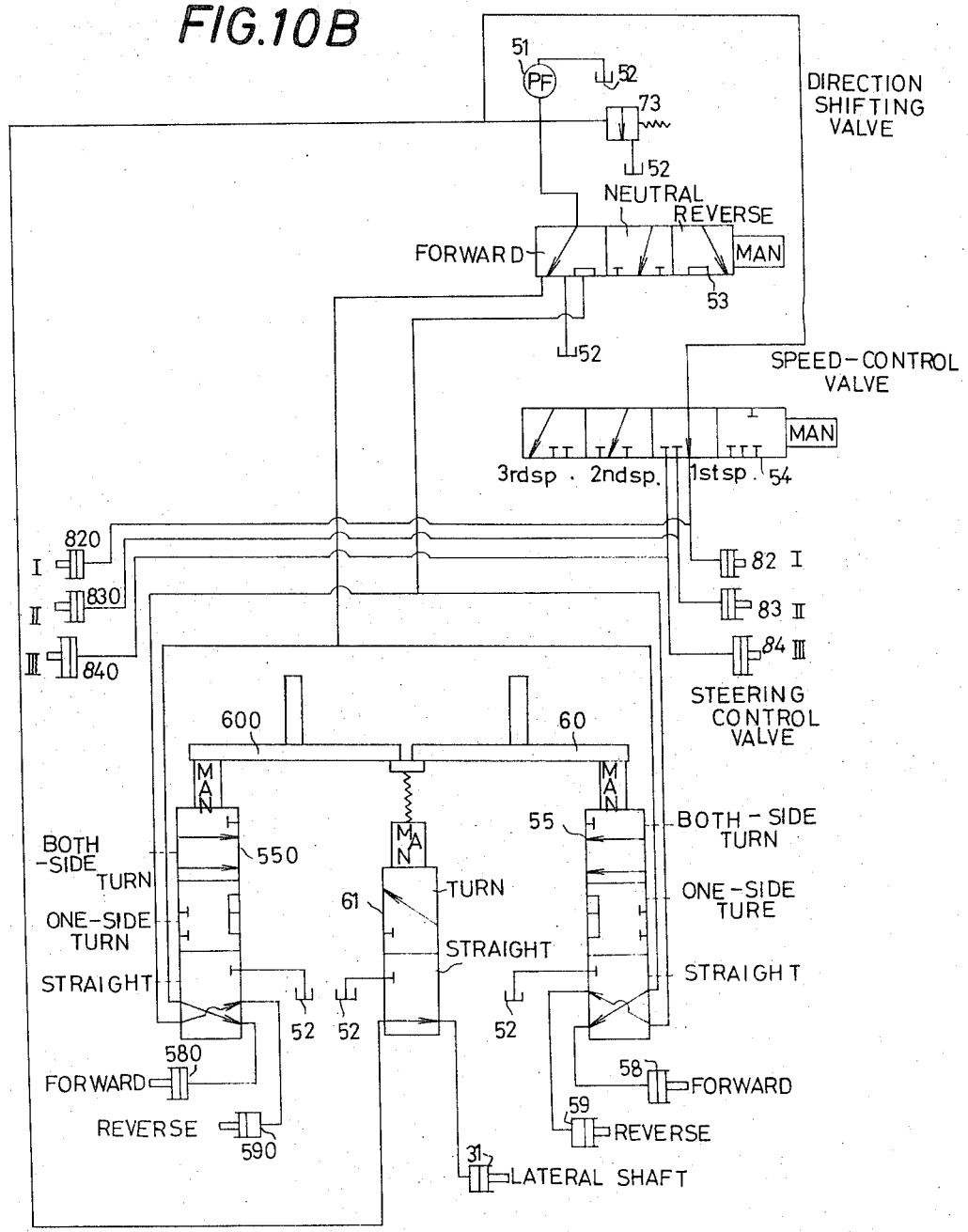
Figure 10C:
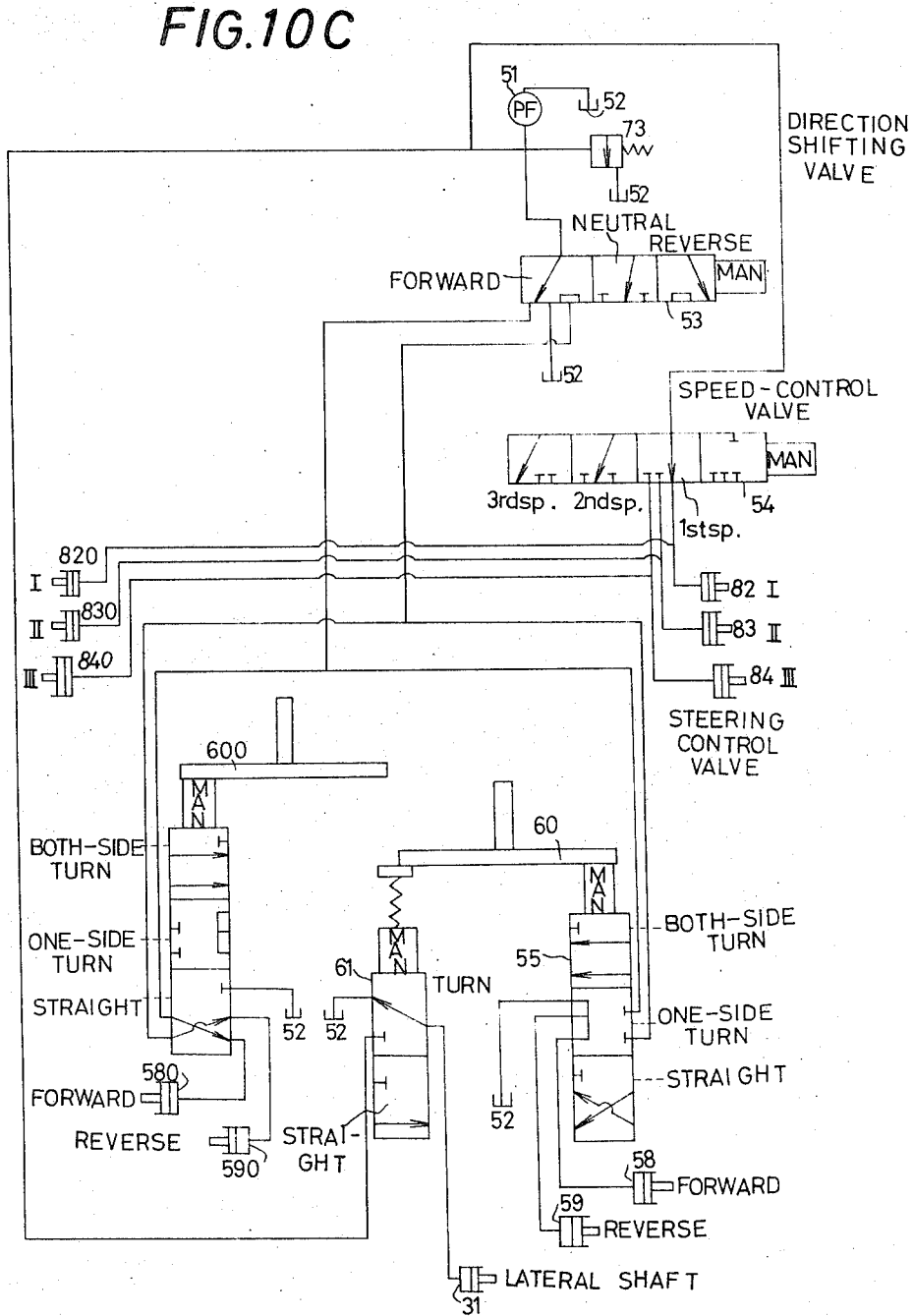
Figure 10D:
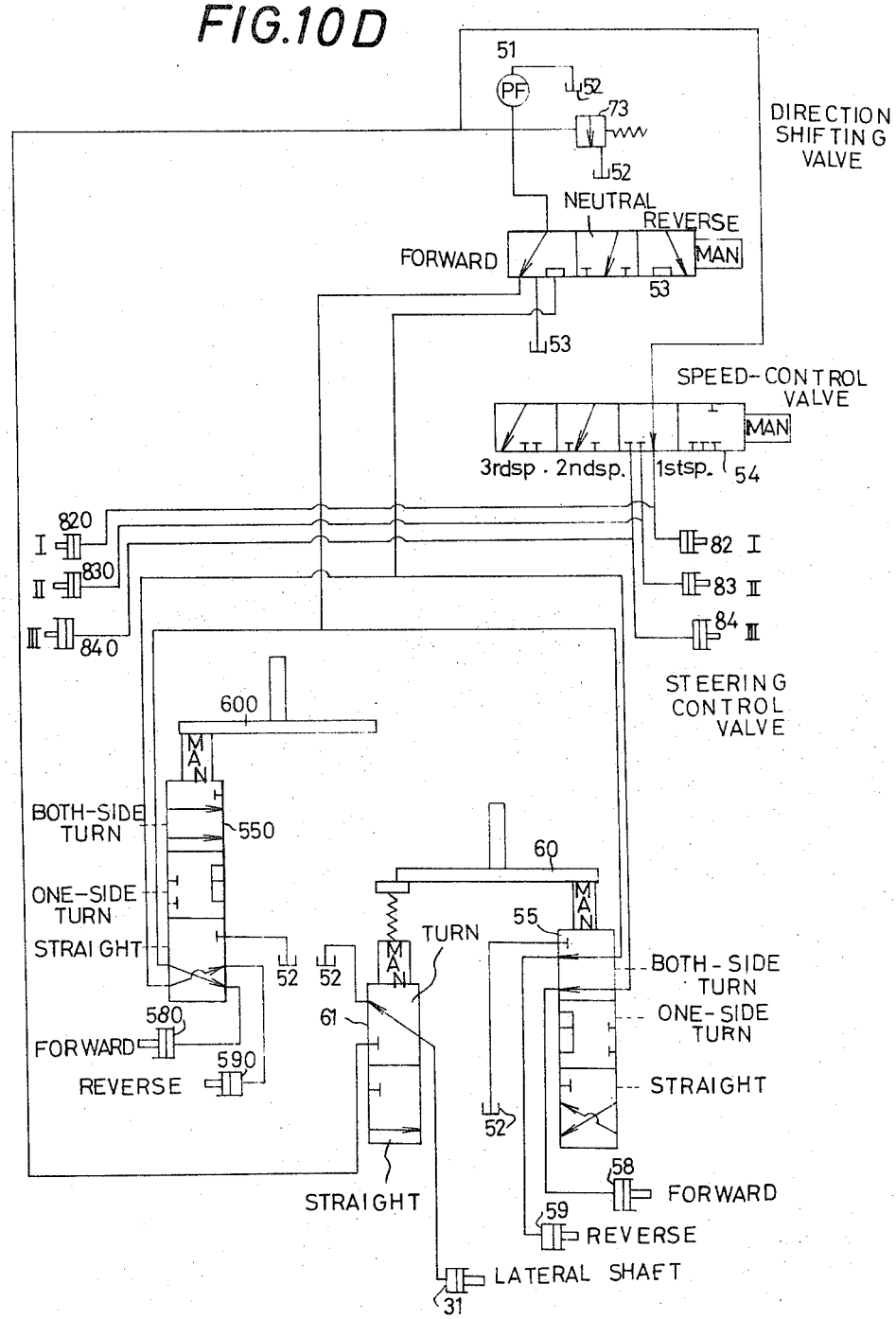

Referring to FIG. 9 which shows another embodiment of the hydraulic control circuit using a lateral shaft engaging clutch pump instead of the pressure compensating valve 72, a lateral shaft engaging clutch pump 101 is used instead of the pressure compensating valve 72 together with a relief valve 102 for maintaining the hydraulic pressure constant.

Reference is now made to FIGS. 10A to 10D, which show still another embodiment of the hydraulic control circuit constructed according to this invention showing the hydraulic control circuits in the neutral, forward and first speed, right one-side turn, and right both-side turn positions, respectively using only one hydraulic pump, direction shifting valve and speed control valve.

The hydraulic control circuit of this embodiment of the steering system has one hydraulic pump 51, together with one relief valve 73, one direction shifting valve 53, and one speed control valve 54. The other constitution is similar to that shown in FIG. 3. In this circuit the direction shifting valve 53 controls both the right and left forward and reverse clutches 58, 580 and 59, 590. The speed control valve 54 also controls both the first, second and third speed clutches 82, 83, 84 and 820, 830, 840.

Referring now to FIGS. 11A to 11D, which show still another embodiment of the hydraulic control circuit constructed according to this invention showing the hydraulic control circuit in the neutral, forward and first speed, right one-side turn, and right both-side turn positions, respectively using similar constitution to that shown in FIGS. 10A to 10D, but using a lateral shaft engaging clutch pump 101 instead of the pressure compensating valve 72 together with a relief valve 102 and right and left lateral shaft engagement control valves 94 and 940 instead of the lateral shaft engagement control valve 61 as shown in FIG. 3.

Figure 11A:
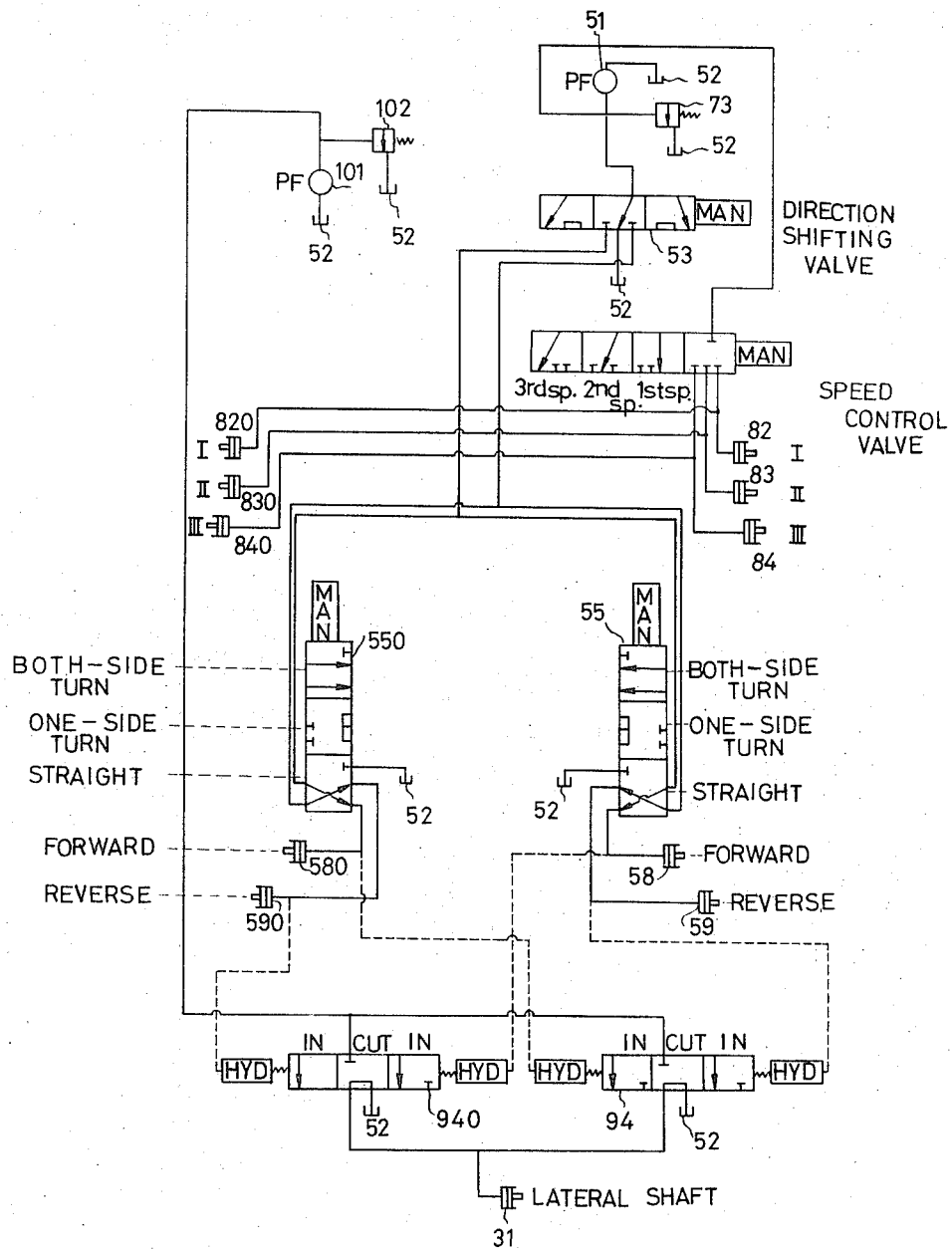
FIGS. 11A to 11D are views similar to FIGS. 4 to 7, respectively, but showing a further embodiment of the hydraulic control circuit of this ivention.
Figure 11B:
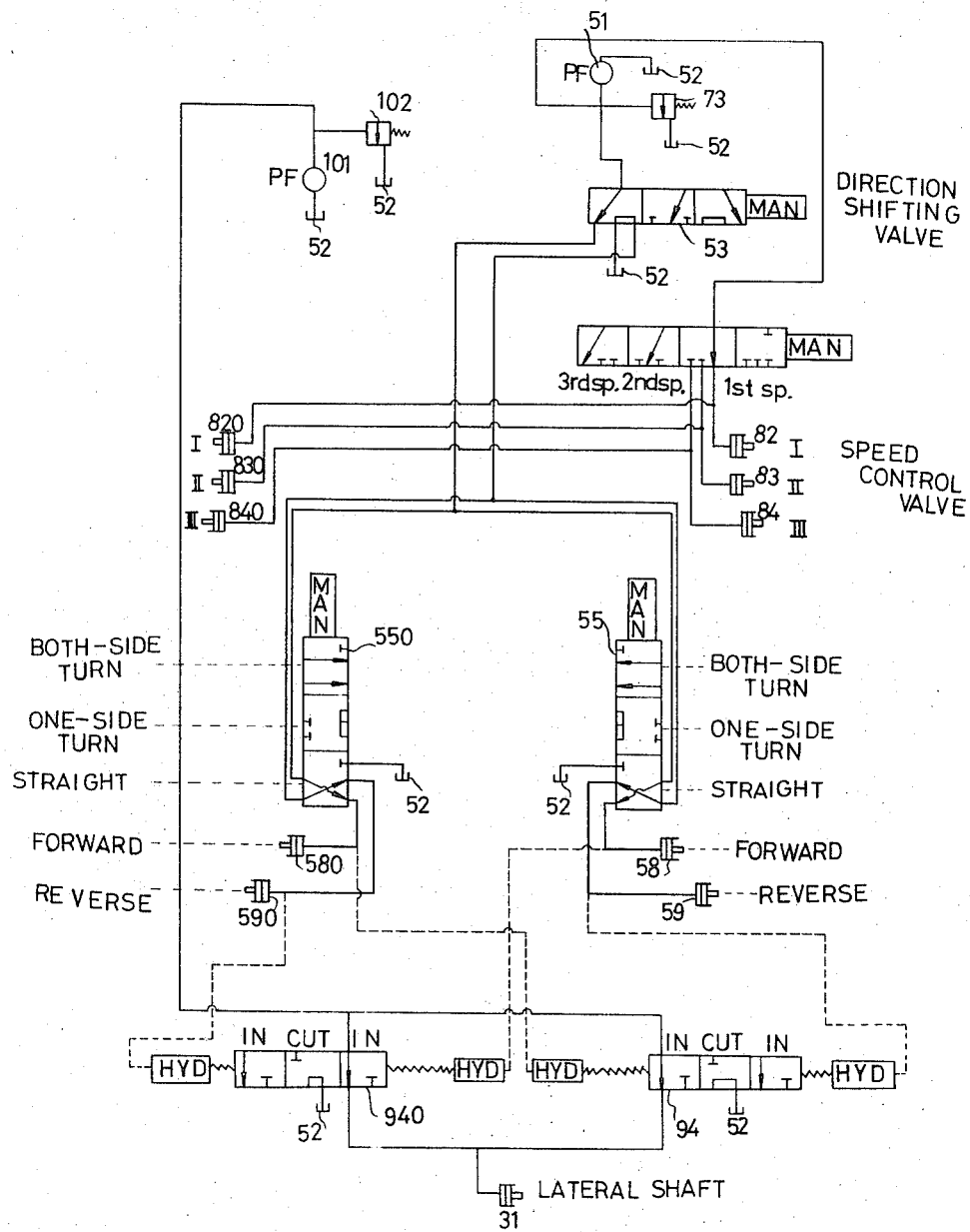

In this hydraulic control circuit, when the steering control valves 55 and 550 are shifted to the straight position while the direction shifting valve 53 is shifted to the forward position and the speed control valve 54 is shifted to the first speed position, for example, as shown in FIG. 11B, the hydraulic fluid from the pump 51 is fed through the direction shifting valve 53 and both the right and left steering control valves 55 and 550 to both the inside of the righ and left lateral shaft engagement control valves 94 and 940 to shift the valves 94 and 940 to the IN position for engaging the lateral shaft integrally to operate the trailer in a straight direction.

Figure 11C:
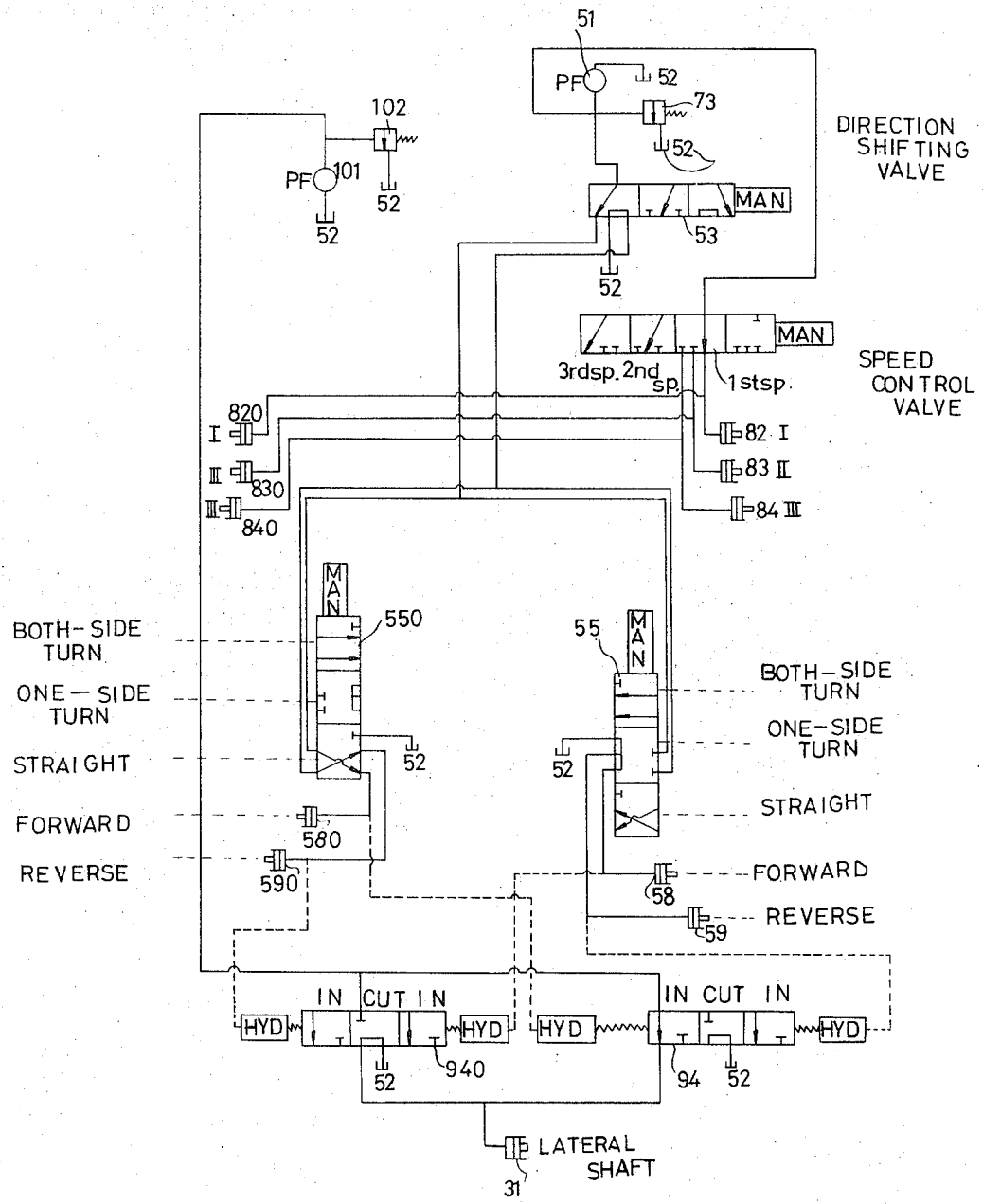

As shown in FIG. 11C, when the steering control valve 55 is further shifted to a one-side turn position from the state as shown in FIG. 11B, the hydraulic fluid from the pump 51 to the left lateral shaft engagement control valve 940 is drained at the returned left lateral shaft engagement control valve 940 to the CUT position with the result that the hydraulic fluid fed to the right lateral shaft engagement control valve 94 is drained through the left lateral shaft engagement control valve 940 to disengage the lateral shaft engaging clutch 31. Simultaneously, the hydraulic fluid from the pump 51 is fed through the direction shifting valve 53 and left steering control valve 550 to the left forward clutch 580 to turn the tractor to the right.

Figure 11D:
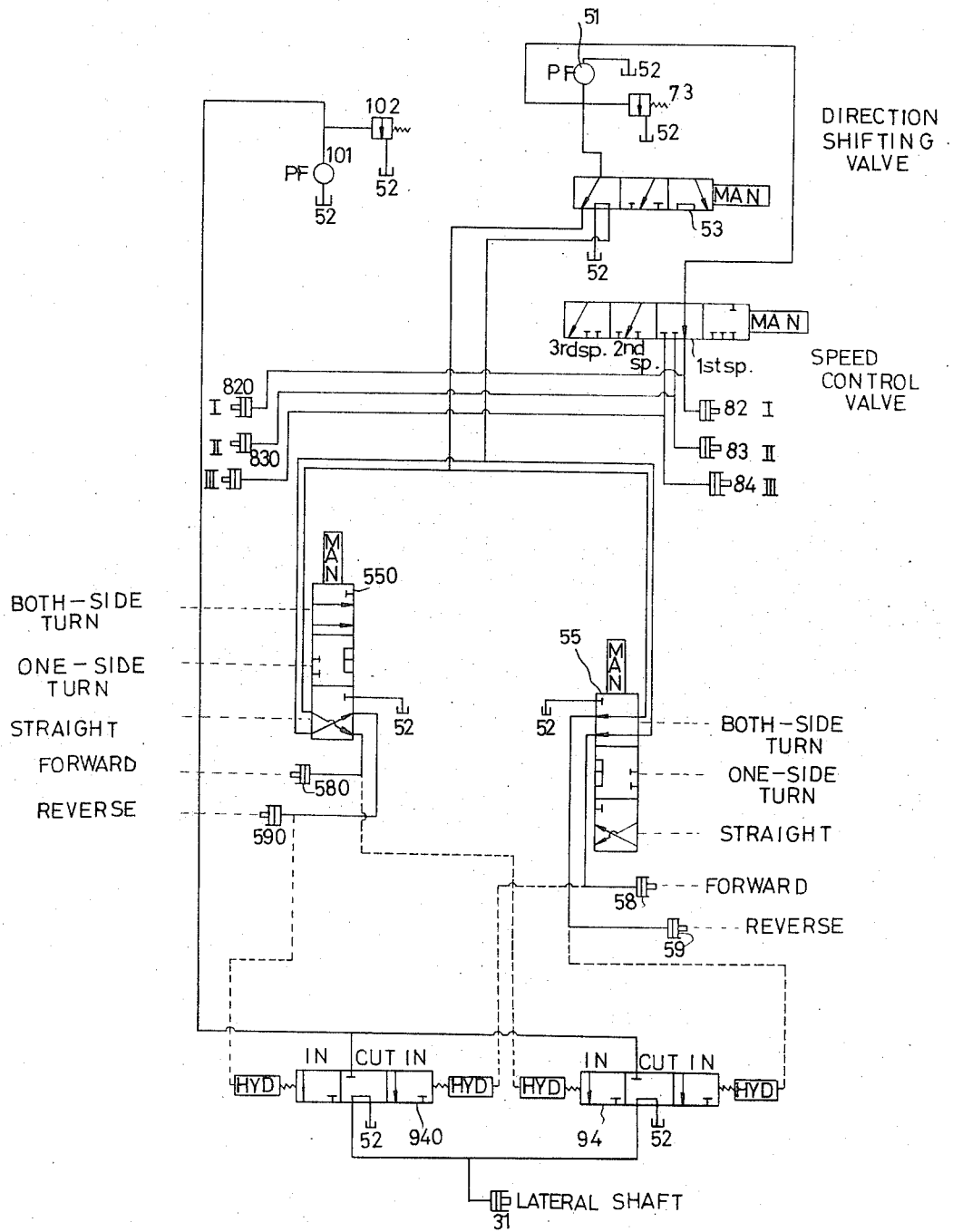
Figure 12A:
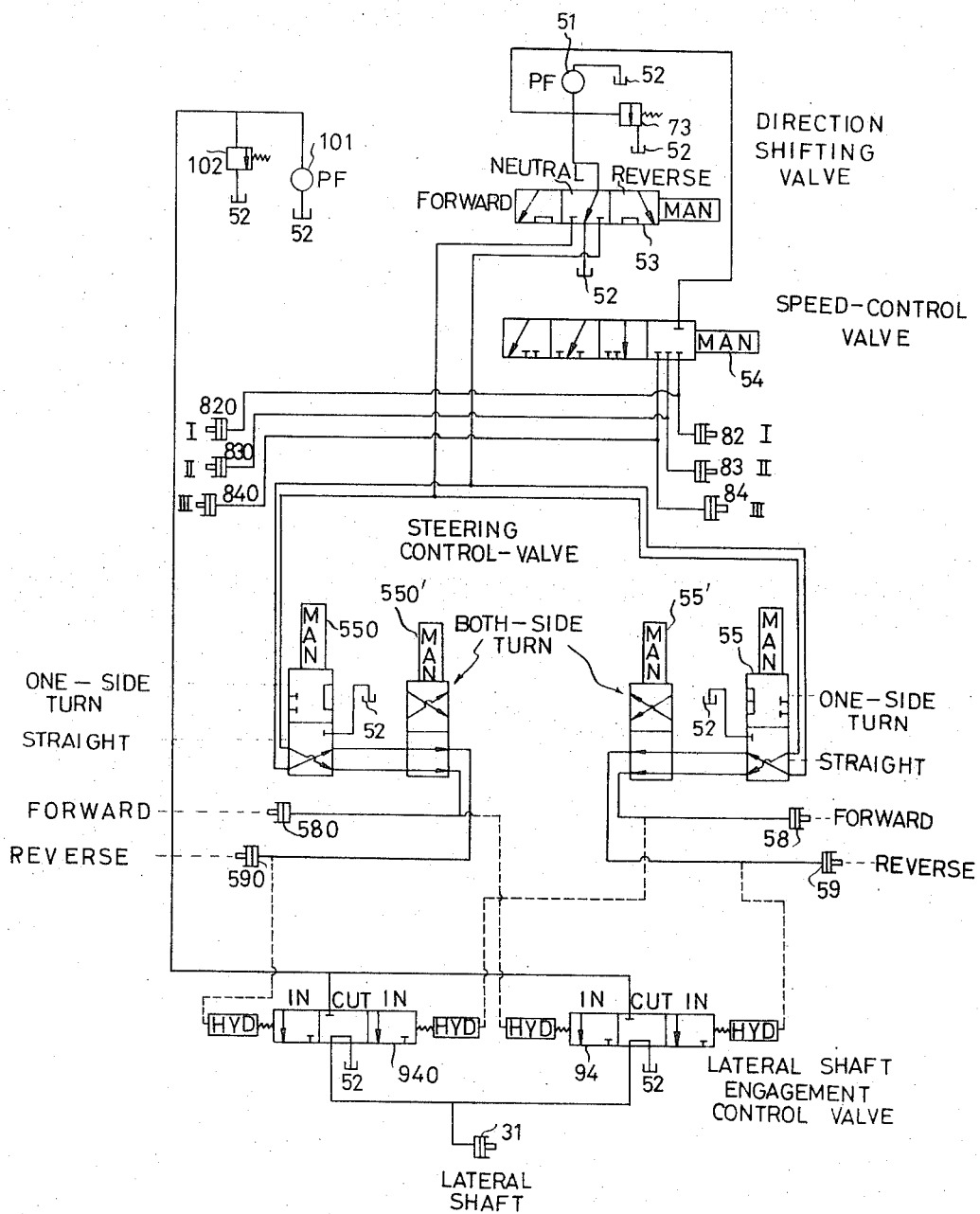
FIGS. 12A to 12D are views similar to FIGS. 4 to 7, respectively, but showing a still another embodiment of the hydraulic control circuit of this invention.
Figure 12B:
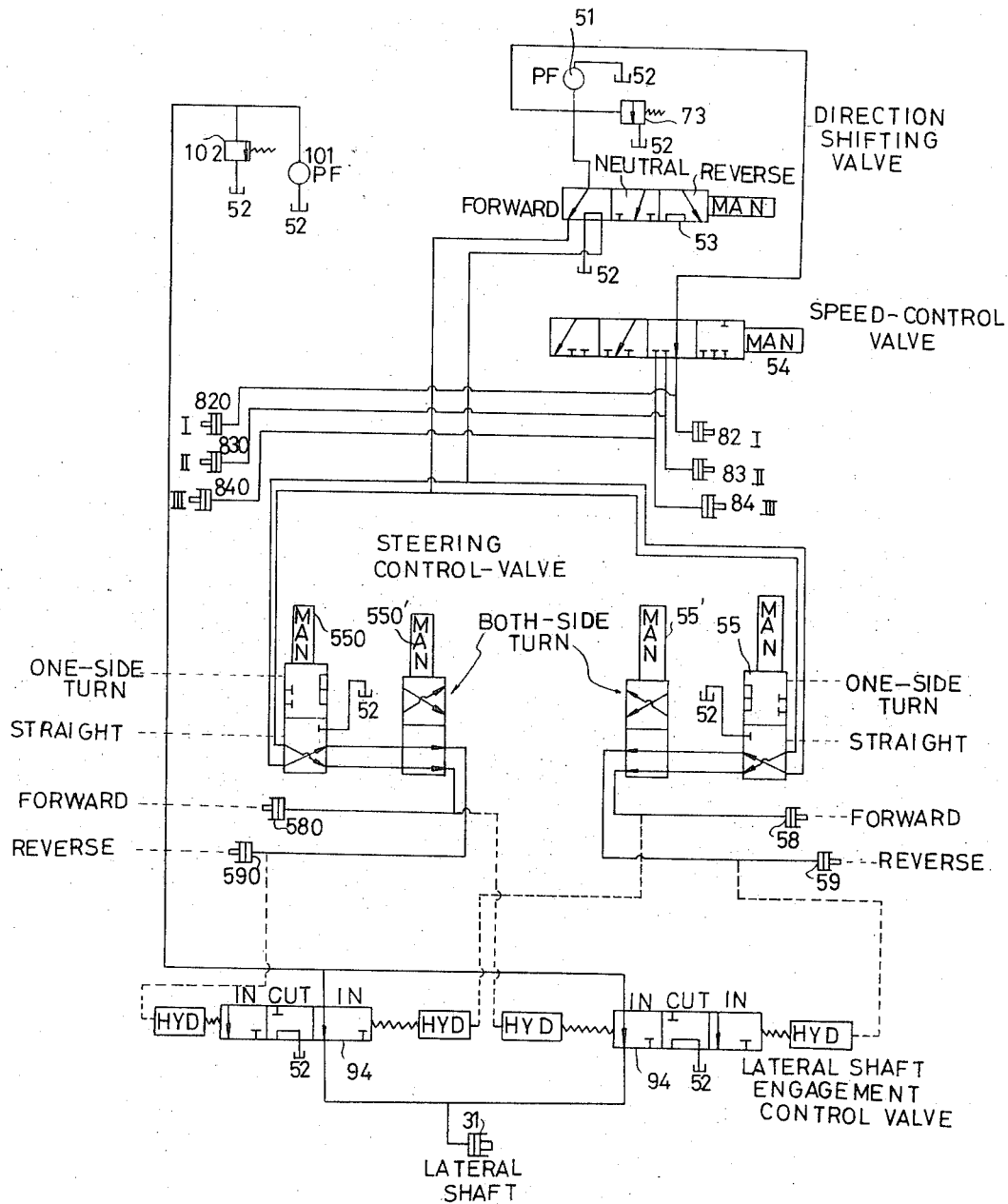
Figure 12C:
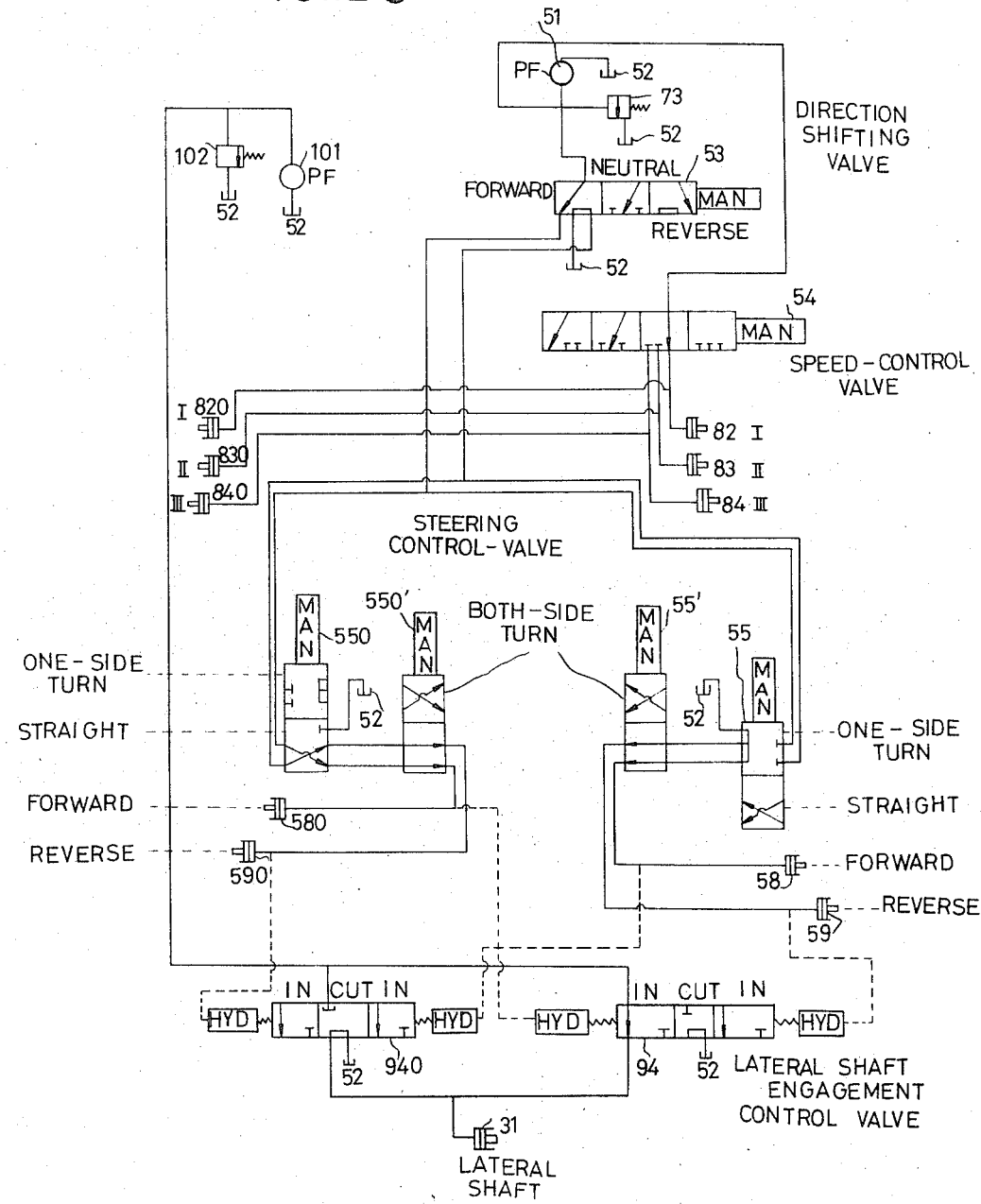
Figure 12D:
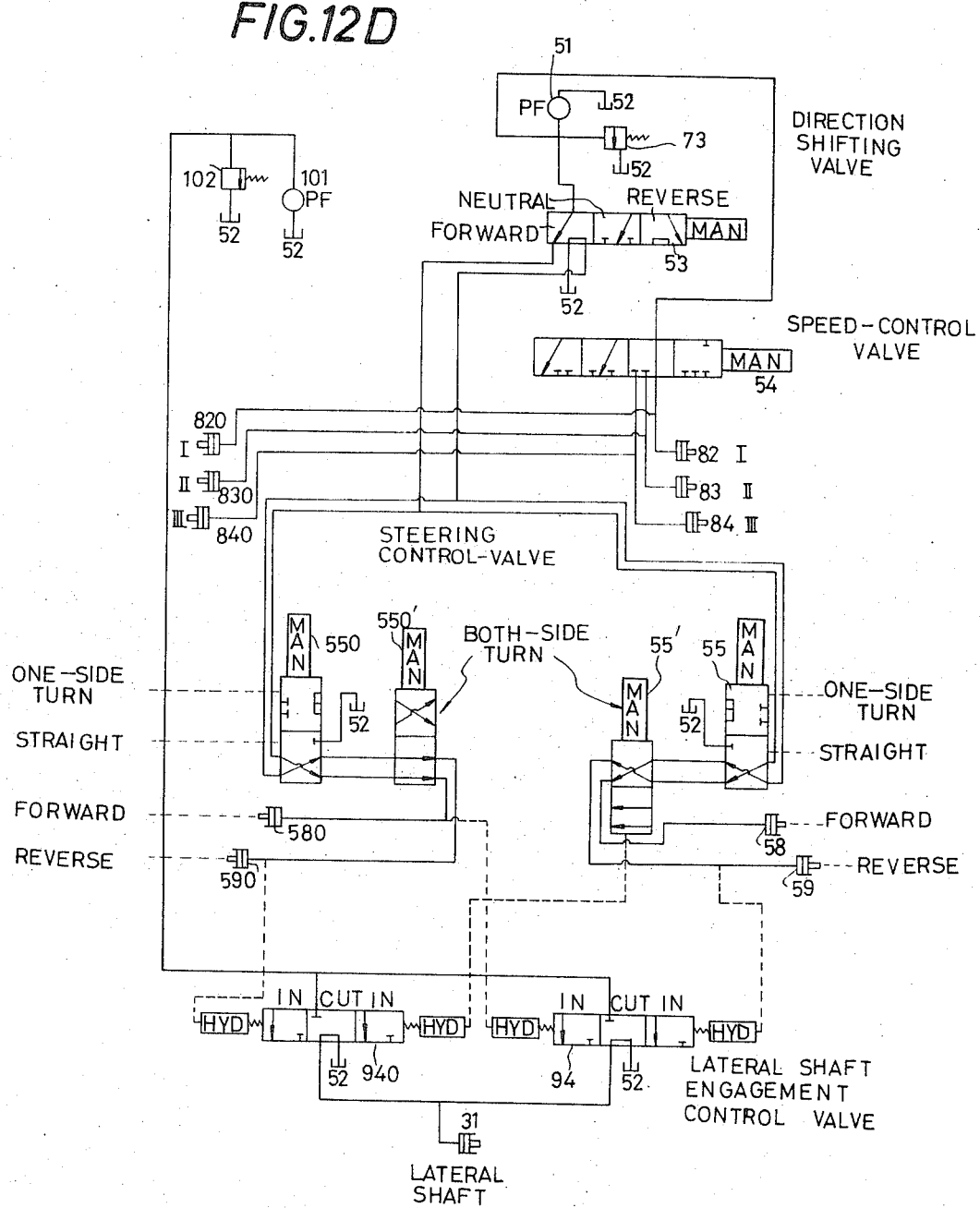

In FIG. 11D, when the steering control valve 55 is further shifted to the both-side turn position from the state as shown in FIG. 11C, the hydraulic fluid from th pump 51 to the right lateral shaft engagement control valve 94 is fed to the right side of the right lateral shaft engagement control valve 94 to shift the valve 94 to CUT position with the result that the hydraulic fluid in the lateral shaft engaging clutch 31 is drained into the oil tank 52. Simultaneously, the hydraulic fluid fed to the right lateral shaft engagement control valve 94 is fed to the reverse clutch 59 to drive both the endless tracks inversely to turn the tractor to the right in a very effective manner.

Reference is now made to 12A to 12D, which shown still another embodiment of the hydraulic control circuit constructed according to this invention showing the hydraulic control circuits in the neuttal, forward and first speed, right one-side turn, and right both-side turn positions, respectively using similar constitution to that shown in FIGS. 11A to 11D, but using right and left steering control valves 55 and 550 each having only straight and one-side turn positions, and other steering control valves 55' and 550' each having a both-side turn position.

In this embodiment, the operations of the one-side turn and both-side turn are independently operated for the large type of tractor, but the operation of the hydraulic circuit is similar to that as shown in FIGS. 11A to 11D. Therefore, no further description will be provided.

It should be understood from the foregoing description that since the power transmission line of the endless track type tractor of this invention has dual power trains so as to bear only half the load of the conventional power train of the tractor to be used commonly with small type of the tractor, it is very advantageous in mass production of the endless track type tractor.

It should also be understood that since the power transmission line of this tractor has dual transmissions, the two transmissions themselves may function to steer the tractor also as a steering system, the steering clutches provided in the output shaft of the conventional bevel gear system are eliminated so as to simplify the construction of the tractor.

It should also be understood that since the power transmission line of this tractor is properly operated such as by a one-side turn and a both-side turn as was described heretofore, it greatly improves the turning performance of the tractor, particularly for large type of tractor.

It should also be understood that since the tractor of this invention has dual power trains, it has a redundancy so that even if one power train is damaged, the other power train may be tentatively operated to sufficiently continue the operation and work so as to improve the reliability of the tractor.

I claim:

1. A steering system foran endless track type tractor having an engine comprising a power distribution device for equally distributing the power of the engine of the tractor to two outputs, a pair of power trains each having a torque converter, a coupling for the power from said power distribution device to said torque converter, a transmission, a lateral output shaft, a bevel gear mechanism having a bevel pinion and a bevel gear for transferring the power from the torque converter through the transmission to said lateral output shaft, and a final recuction gear mechanism having a pinion and a gear for transferring the power from said lateral output shaft to a sprocket for driving the endless track, a lateral shaft engaging clutch for engaging directly the lateral shafts to each other when hydraulically energized and for disengaging the direct coupling of the lateral shafts when hydraulically deenergized, a pair of steering brakes for braking either one lateral shaft to turn the tractor rightwardly or leftwardly when said lateral sahft engagin clutch is disengaged and either one transmission is shifted to neutral position, a hydraulic control device having an oil reservoir, a pair of hydraulic pumps, a pair of forward clutches for engaging the transmission in the forward direction when hydraulically energized, a pair of reverse clutches for engaging the transmission in the reverse direction when hydraulically energized, a pair of direction shifting valves each having forward, neutral and reverse positions for feeding hydraulic fluid from either hydraulic pump to said either forward clutch, for draining the hydraulic fluid, and for feeding hydraulic fluid from either pump to said either said reverse clutch and for draining either said forward clutch, respectively when manually shifted, a pair of first speed clutches for engaging the transmission at first speed, a pair of second speed clutches for engaging the transmission at second speed, or a pair of third speed clutches for engaging the transmission at third speed, a pair of speed control valves each having neutral and first, second or third speed positions for feeding hydraulic fluid from either said hydraulic pump to said oil reservoir, first, second or third speed clutches, respectively when manually operated, a pair of steering control valves each having straight, one-side turn and both-side turn positions for feeding the hydraulic fluid from the hydraulic pump to said forward or reverse clutches, for draining either forward clutch and reverse clutches and for feeding the hydraulic fluid from the hydraulic pump to either forward clutch and for feeding the hydraulic fluid from the pump to one forward clutch and for feeding the hydraulic fluid from the pump to the other reverse clutch when manually operated, and a lateral shaft engagement control valve having straight and turn positions for feeding the hydraulic fluid from the hydraulic pump to said lateral shaft engaging clutch and for draining said lateral shaft engaging clutch when manually operated.

2. The steering system according to claim 1, further comprising a pressure compensating valve for gathering equally the hydraulic fluid from said pumps to engage the lateral shaft engaging clutch and hydraulically connected at both side ends to said hydraulic pumps, respectively and having a pair of fluid passages formed therein for gathering the hydraulic fluid from said pumps and another pair of fluid passages for flowing the fluid from either pump to the fluid output.

3. The steering system according to claim 2, wherein said pressure compensating valve is composed of a lateral shaft engaging clutch pump hydraulically connected to said lateral shaft engagement control valve from said oil reservoir, and a relief valve hydraulically connected to the output of said lateral shaft engaging clutch pump from said oil reservoir for maintaining the hydraulic pressure constant.

4. The steeering system according to claim 1, wherein said lateral shaft engagement control valve is composed of a pair of lateral shaft engagement control valves one of them hydraulically connected at both side ends to said one forward clutch and said other reverse clutch and other of them hydraulically connected at both side ends to said other forward clutch and said reverse clutch, and each having a CUT position at the center and IN positions at both sides of the CUT position for disengaging said lateral engaging clutch and for engaging said lateral engaging clutch respectively.

5. A steering system at set forth in claim 1 wherein said hydraulic control device comprises a lateral shaft engaging clutch pump and a relief valve for maintaining the hydraulic pressure constant.

6. A steering system as set forth in claim 5, wherein said hydraulic control device comprises a pair of lateral shaft engagement control valves for engaging said lateral shaft engaging clutch.

7. A steering system as set forth in claim 5, wherein said hydraulic control device comprises a pair of first steering control valves each having straight and one-side positions, and a pair of second steering control valves each having both-side turn position.

* * * * *